(12) United States Patent
Churan et al.

(10) Patent No.: US 7,640,130 B2
(45) Date of Patent: Dec. 29, 2009

(54) SYSTEMS AND METHODS FOR VERIFICATION OF A VERIFIABLE DEVICE

(75) Inventors: John Scott Churan, Westerville, OH (US); Philip Mark Metzler, Columbus, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 45 days.

(21) Appl. No.: 11/923,196

(22) Filed: Oct. 24, 2007

(65) Prior Publication Data

US 2008/0103716 A1  May 1, 2008

Related U.S. Application Data (60) Provisional application No. 60/862,983, filed on Oct. 25, 2006.

(51) Int. Cl.
| | |
|---|---|
| *G01G 23/01* | (2006.01) |
| *G01G 23/00* | (2006.01) |
| *G01G 19/00* | (2006.01) |
| *G01D 18/00* | (2006.01) |
| *G06F 19/00* | (2006.01) |
| *G06F 17/40* | (2006.01) |

(52) U.S. Cl. .......... 702/101; 73/1.01; 73/1.08; 73/1.13; 73/1.15; 177/1; 702/1; 702/85; 702/102; 702/104; 702/105; 702/127; 702/182; 702/187; 702/188; 705/1

(58) Field of Classification Search ......... 73/1.01, 73/1.08, 1.13, 1.15, 1.16, 1.27, 1.28, 1.36, 73/1.73, 1.74, 1.79, 1.81, 865.8, 865.9; 177/1, 177/25.11, 25.12, 25.13, 25.14, 25.15, 25.17, 177/25.18, 50; 235/29 A, 29 R, 30 A, 30 R, 235/33, 95 R, 96, 98; 340/500, 540, 679, 340/870.01, 870.07, 870.16; 380/2; 702/1, 702/85, 94, 95, 96, 97, 100, 101, 102, 104, 702/105, 127, 182, 187, 188; 705/1, 400, 705/401, 402, 403, 404, 405, 406, 407, 408, 705/409, 410, 411, 412, 413, 414, 415, 416, 705/417, 418, 500; 709/217, 218, 219
See application file for complete search history.

(56) References Cited

U.S. PATENT DOCUMENTS 2,883,255 A * 4/1959 Anderson ............ 346/34

(Continued)

FOREIGN PATENT DOCUMENTS

JP    59-46561 A *  3/1984

*Primary Examiner*—Edward R Cosimano
(74) *Attorney, Agent, or Firm*—Standley Law Group LLP (57) ABSTRACT

Systems and methods for effectuating verification and certification of verifiable devices. Preferably, but not necessarily, such certification occurs or is communicated remotely. A verifiable device may be directly or indirectly connected to an appropriate regulatory agency through a communication mechanism. One or more tests may be performed on the verifiable device to verify that the device is functioning properly. The test results are directly or indirectly transmitted to the regulatory agency. If the tests were passed then the verifiable device may be approved for use. When self-certification or remote certification is provided for, the need for in-person verification and certification procedures by agency personnel may be eliminated.

21 Claims, 5 Drawing Sheets

U.S. PATENT DOCUMENTS

| | | | |
|---|---|---|---|
| 3,255,439 A * | 6/1966 | Simjian | 705/403 |
| 4,812,965 A * | 3/1989 | Taylor | 705/401 |
| 4,837,701 A * | 6/1989 | Sansone et al. | 705/404 |
| 4,853,864 A * | 8/1989 | Hart et al. | 705/403 |
| 4,890,246 A | 12/1989 | Oldendorf et al. | |
| 4,907,161 A * | 3/1990 | Sansone et al. | 705/403 |
| 4,917,199 A | 4/1990 | Loshbough | |
| 5,006,812 A * | 4/1991 | Erickson | 330/2 |
| 5,008,827 A * | 4/1991 | Sansone et al. | 705/409 |
| 5,202,834 A * | 4/1993 | Gilham | 705/404 |
| 5,224,046 A * | 6/1993 | Kim et al. | 705/403 |
| 5,550,328 A | 8/1996 | Freeman et al. | |
| 5,638,442 A | 6/1997 | Gargiulo et al. | |
| 5,715,164 A * | 2/1998 | Liechti et al. | 705/410 |
| 5,719,775 A * | 2/1998 | Abumehdi | 705/410 |
| 5,729,460 A * | 3/1998 | Plett et al. | 705/403 |
| 5,812,990 A * | 9/1998 | Ryan et al. | 705/403 |
| 5,878,376 A | 3/1999 | Schurr | |
| 6,098,032 A * | 8/2000 | Brookner | 702/182 |
| 6,246,967 B1 | 6/2001 | Libicki et al. | |
| 6,289,323 B1 * | 9/2001 | Gordon et al. | 705/40 |
| 6,424,954 B1 * | 7/2002 | Leon | 705/401 |
| 6,777,624 B2 | 8/2004 | Hamamoto | |
| 6,844,825 B2 | 1/2005 | Shincovich | |
| 7,149,701 B2 * | 12/2006 | McKinney | 705/8 |
| 2002/0198990 A1 * | 12/2002 | Bradfield et al. | 709/224 |
| 2004/0019511 A1 * | 1/2004 | McKinney | 705/8 |
| 2005/0272419 A1 | 12/2005 | Matsuo et al. | |
| 2006/0005254 A1 * | 1/2006 | Ross | 726/27 |

* cited by examiner

SYSTEMS AND METHODS FOR VERIFICATION OF A VERIFIABLE DEVICE

This application claims the priority benefit of expired U.S. Provisional Patent Application No. 60/862,983, filed Oct. 25, 2006, which is hereby incorporated by reference in its entirety.

BACKGROUND OF THE INVENTIVE FIELD

The present invention relates generally to verifiable (e.g., legal for trade) devices and particularly to systems and methods for verification of verifiable devices by an appropriate regulatory agency. More specifically, the present invention is directed to systems and methods by which verifiable devices may be verified for use by an appropriate regulatory agency, without the need for in-person inspection by an officer or agent thereof.

A verifiable device can be generally described as a device that must be approved by an authorized entity before it can be used in a commercial setting. One skilled in the art would understand that a variety of devices may meet this definition. For example, a legal for trade device is a commonly known verifiable device that is intended for use in a commercial transaction where an amount of money will be paid based on a measured characteristic of a product, parcel, etc. A weighing apparatus used to weigh a product that is sold by weight is a common example of such a legal for trade device.

Generally, a verifiable device such as a legal for trade weighing apparatus must be certified or otherwise approved by an official or approved agent of an appropriate regulatory agency before being placed into service. This helps to ensure that the amount of money paid accurately reflects the measured characteristic of the product, parcel, etc. involved in the associated transaction. Examples of such transactions may include but are not limited to, payment for parcel postage through the U.S. Postal Service or another carrier, the price paid for a food product, the price paid for an amount of a liquid product such as gasoline or propane, the amount of taxes collected on goods transported via truck, etc.

Currently, when a verifiable device such as a legal for trade weighing apparatus is purchased, arrangements must be made for an official or approved agent of an appropriate regulatory agency to visit the location of the verifiable device and to test, certify and, optionally, seal the verifiable device. The official or agent physically travels to the location of the verifiable device to perform this service. The official or agent performs one or more tests of the verifiable device to verify that it is performing correctly. If the verifiable device passes the test(s) then the official or agent may mechanically or electronically seal the verifiable device and record information about the verifiable device for subsequent tracking purposes. Once the verifiable device is certified and, optionally, sealed, it is ready to use. The owner is generally required to pay for this service.

As described above, the official or agent may perform one or more inspections, tests and/or operations of/on the verifiable device to verify that it is functioning properly and that its performance is unaltered. These inspections/tests/operations may include, but are not limited to, verifying that the verifiable device is marked correctly (serial number, model number, etc.), verifying that the verifiable device is placed on a steady surface, verifying that the display of the verifiable device functions properly, verifying that the verifiable device is level, entering of a geo code associated with the location of the verifiable device, calibrating the verifiable device and/or performing measurement accuracy testing. Any or all of these inspections, tests and/or operations, as well as others, may be performed.

Once the tests are successfully performed and proper device operation has been certified, the official may electronically and/or physically seal the verifiable device. Typically, once a verifiable device has been initially sealed, an official or approved agent of the appropriate agency should return to the location of the verifiable device on a periodic basis (monthly, quarterly, annually, etc.) to verify that the seal is unbroken. At this time, the official or approved agent may re-perform any or all of the above-described inspections, tests and/or operations.

This process is both time consuming and expensive for the owner of the verifiable device and typically requires government resources to complete. Unfortunately, such government resources may be limited. Additionally, verifiable device owners may be unaware that they are legally required to have their verifiable devices certified. Another concern with this certification method is that regulatory agency records sometimes become lost, whether due to the exchange of data and data entry that occurs with the regulatory agency or otherwise.

As a result of the aforementioned issues, many of the verifiable device inspections and/or tests that are mandated as recurring may not be performed again due to a lack of records, and/or a lack of officials or approved agents available to perform the large number of certification/re-certification procedures awaiting them around the U.S. and the world. This is problematic because verifiable devices may resultingly produce inaccurate measurements for an extended length of time without the knowledge of the appropriate regulatory agency. This may cause incorrect transactions, such as a loss of money for the legal for trade device owner, or the overcharging of customers.

SUMMARY OF THE GENERAL INVENTIVE CONCEPT

The present invention is directed at solving or mitigating many of these problems. Exemplary embodiments of the present invention may include systems and methods useable by a regulatory agency to remotely certify a verifiable device (e.g., a legal for trade device) and to remotely approve a verifiable device for use. The systems may include a verifiable device, a communication mechanism and a regulatory agency. In addition to communications with a regulatory agency, systems of the present invention may also allow for communications with a customer, a manufacturer and/or a third party. The verifiable device may perform one or more tests to verify that its readings are accurate and may communicate the results of those tests to the regulatory agency through the communication mechanism. Other information may also be communicated to the regulatory agency. The regulatory agency can use the received information to certify the verifiable device for use—preferably, but not necessarily, by a remote process.

While one skilled in the art would understand that a variety of devices may meet the definition of a verifiable device, for purposes of simplicity, only a legal for trade device will be used hereinafter to describe various aspects of exemplary embodiments of the present invention. However, it is to be understood that the present invention may also be applied to verifiable devices other than legal for trade devices, and nothing herein is to be interpreted as limiting the scope of the present invention solely to a legal for trade device.

BRIEF DESCRIPTION OF THE DRAWINGS

In addition to the features mentioned above, other aspects will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

As used herein, the term "legal for trade device" means a device designed for use in a commercial transaction wherein money will be paid based on some measurement taken by the device. As such, a legal for trade device may include, but is not limited to, a scale, balance, or any other type of weighing apparatus or weighing system. A legal for trade device us used herein may also include a dimensioner that measures the exterior dimensions of a parcel or other package, or any other device or system, whether currently known or yet to be invented, that measures some physical characteristic(s) of an object(s) for the purpose of valuing a monetary transaction. A legal for trade device according to the present invention may further include components such as terminals or other display devices, input devices, data storage means, etc. Therefore, as used herein, the term "device" is not limited to a single component but, rather, may include a number of components that together provide a desired function.

With respect to the present invention, a legal for trade device may be any of various devices, as discussed above. For example, a legal for trade device may be a weighing system having a weighing apparatus and a terminal. Any weighing apparatus known in the art may be used, such as for example, the PS60 Scale available from Mettler-Toledo, Inc. The terminal may also be any terminal known in the art, such as, but not limited to, terminals, indicators, built-in displays and personal computers. One example of a terminal that may be used is a JAGXTREME terminal, also available from Mettler-Toledo, Inc.

The legal for trade device may be associated with a wired or wireless communication mechanism, including, but not limited to, mail, fax, telephone, email, website and/or network, such as, LAN, WAN, WLAN and/or Internet. A regulatory agency may be associated with the communication mechanism. The regulatory agency may be any governmental body that is responsible for regulating the use of legal for trade devices in a particular jurisdiction (i.e., city, county, state, country).

During a verification procedure, the legal for trade device may direct the owner through one or more tests or other verification operations. Alternatively, a manual or other documentation may be provided with a legal for trade device to guide an owner through one or more tests or other verification operations. In any event, the legal for trade device may allow a person who is not trained as a technician to perform one or more tests normally performed by a trained technician. Alternatively, it is possible for the legal for trade device to conduct a verification procedure on its own. Once the one or more tests and/or other operations are completed successfully, the legal for trade device can communicate the results to the regulatory agency through the communication mechanism, whereafter the agency may use the results to approve the legal for trade device for use.

Figure 1:
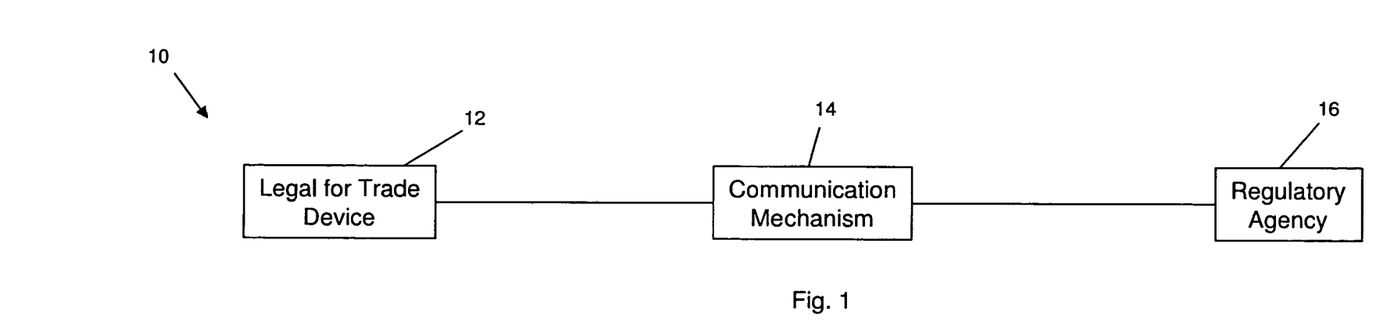
FIG. 1 illustrates one exemplary embodiment of a system for remotely certifying a legal for trade device.

As shown in FIG. 1, one exemplary embodiment of a remote certification system 10 may include a legal for trade device 12, a communication mechanism 14 and a regulatory agency 16. The legal for trade device 12 may be a weighing apparatus, a dimensioner, or any other type of device described above. As also described, a display device and/or various other components may be associated with and form a part of the legal for trade device 12. When a display device is present, the legal for trade device and display device may be separate components or may be integrated into a single unit. The communication mechanism 14 may be any one or more of the communication mechanisms described above. The legal for trade device 12 may be associated with the communication mechanism 14, which may be associated with the regulatory agency 16.

In another exemplary embodiment, a remote certification system 20, as shown in FIG. 2, may again have a legal for trade device 22 associated with a communication mechanism 24. In this embodiment, however, the communication mechanism 24 is associated with a manufacturer or third party 26 that is, in turn, in communication with a regulatory agency 28. As with the embodiment of FIG. 1, a display device and/or various other components may be associated with and form a part of the legal for trade device 22.

Figure 2:
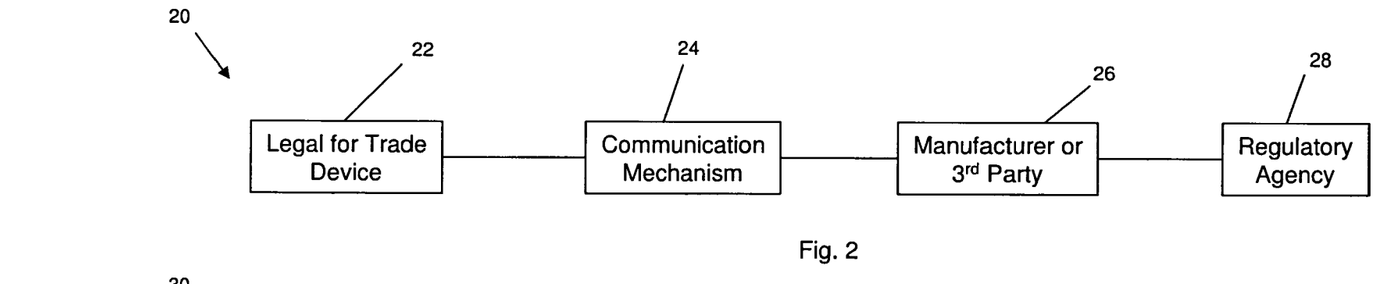
FIG. 2 illustrates another exemplary embodiment of a system for remotely certifying a legal for trade device.

When the communication mechanism 24 is in communication with a manufacturer, the manufacturer is most likely to be the manufacturer of the measurement component (e.g., scale, dimensioner, etc.) of the legal for trade device, but could be the manufacturer of another component(s) as well. When the communication mechanism 24 is in communication with a third party, the third party may be any of various entities such as, for example, an intermediary company that facilitates communication between a regulatory agency and an owner of a legal for trade device and assists with the remote certification process. The third party may be related to or associated with a manufacturer or a regulatory agency, or may be independent of both.

Figure 3:
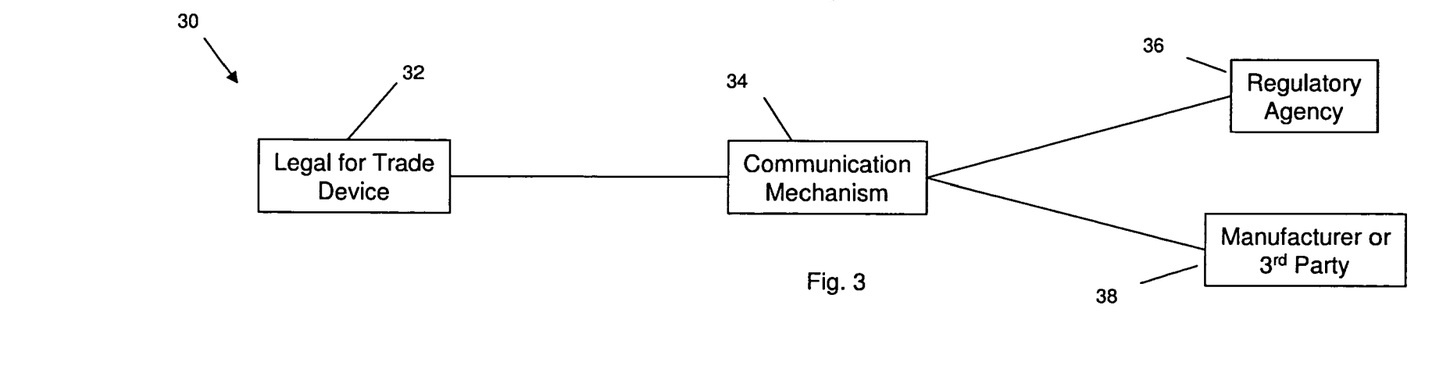
FIG. 3 illustrates another exemplary embodiment of a system for remotely certifying a legal for trade device.

Referring now to FIG. 3, another exemplary embodiment of a remote certification system 30 may again include a legal for trade device 32 associated with a communication mechanism 34. As with the embodiment of FIGS. 1-2, a display device and/or various other components may be associated with and form a part of the legal for trade device 32. A regulatory agency 36 and a manufacturer or third party 38 are also again present. Unlike the embodiment of the present invention shown in FIG. 2, however, the communication mechanism 34 of this embodiment may communicate directly with the regulatory agency 36, as well as with the manufacturer or third party 38.

Figure 4:
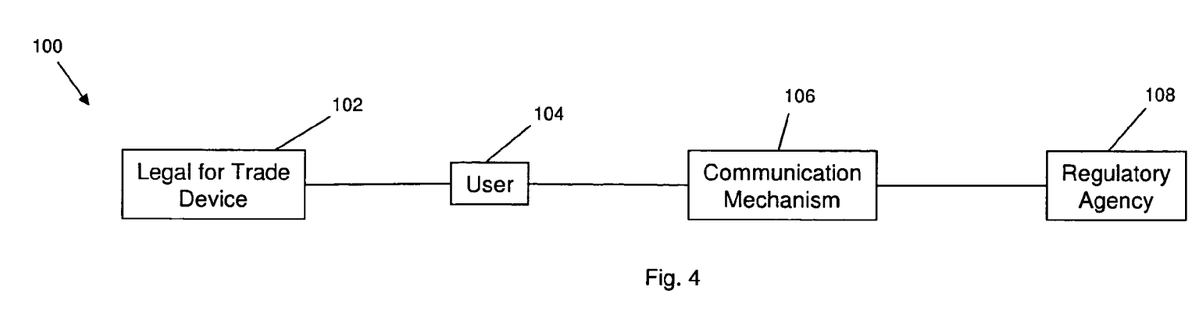
FIG. 4 illustrates another exemplary embodiment of a system for remotely certifying a legal for trade device.

Referring now to FIG. 4, an exemplary embodiment of a remote certification system 100 that is similar to the remote certification system 10 illustrated in FIG. 1 can be observed. The system 100 may again include a legal for trade device 102, a communication mechanism 106 and a regulatory agency 108. The legal for trade device 102 may again be a weighing apparatus, a dimensioner, or any other type of device described above. Display devices and/or various other components may again be associated with and form a part of the legal for trade device 102. The communication mechanism 106 may be any one or more of the communication mechanisms described above.

The difference between this embodiment of the system 100 and the system 10 of FIG. 1, is that in this system, a user 104 communicates data obtained from the legal for trade device 102 to the regulatory agency 108 using the communication mechanism 106. The user may be the owner of the legal for trade device 102, a person working with the legal for trade device, a regulatory agency associate, etc.

Figure 5:
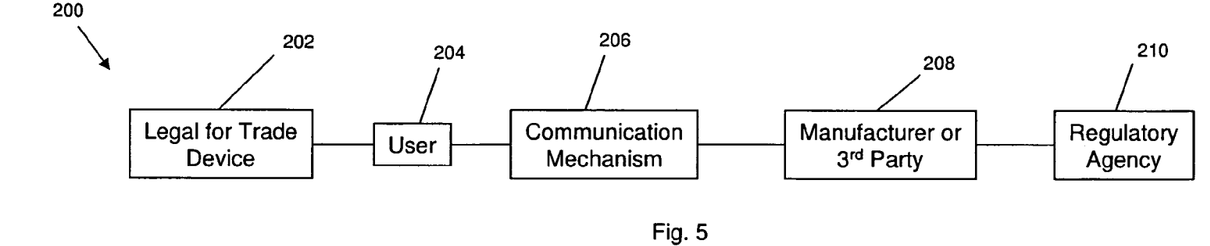
FIG. 5 illustrates another exemplary embodiment of a system for remotely certifying a legal for trade device.

Another exemplary embodiment is shown in FIG. 5. In this embodiment, a remote certification system 200 may again have a legal for trade device 202 associated with a communication mechanism 206. This embodiment is similar to the embodiment of FIG. 2, in that the communication mechanism 206 is associated with a manufacturer or third party 208 that is, in turn, in communication with a regulatory agency 210. As with the embodiment of FIG. 2, a display device and/or various other components may again be associated with and form a part of the legal for trade device 202. As with the embodiment of FIG. 4, a user 204 again acts as an intermediary between the legal for trade device 202 and the communication mechanism 206.

Figure 6:
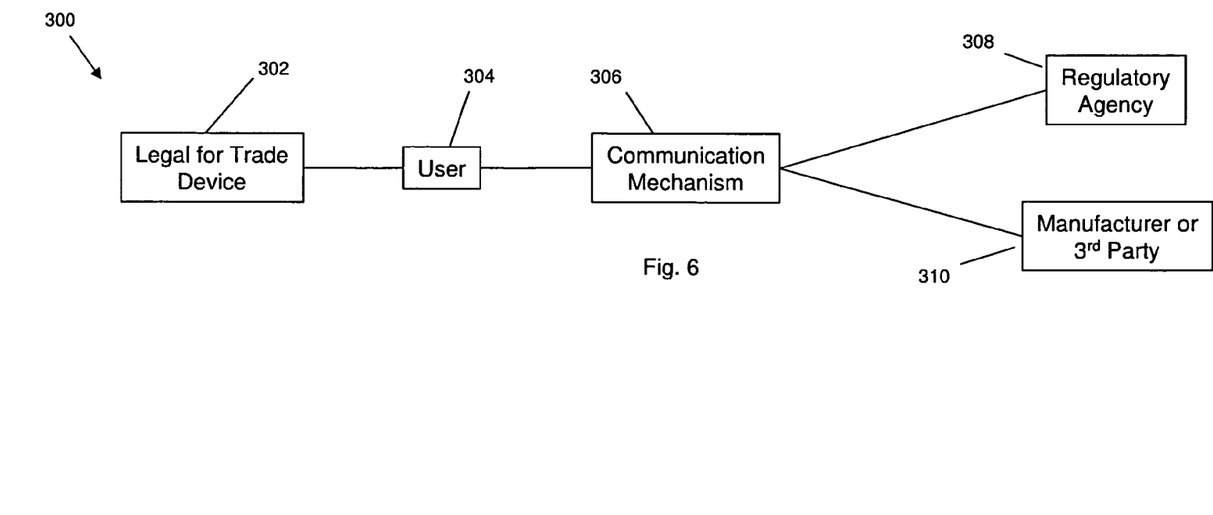
FIG. 6 illustrates another exemplary embodiment of a system for remotely certifying a legal for trade device.

Referring now to FIG. 6, another exemplary embodiment of a remote certification system 300 may again include a legal for trade device 302 associated with a communication mechanism 306. As with the previous embodiments, a display device and/or various other components may be associated with and form a part of the legal for trade device 302. A regulatory agency 308 and a manufacturer or third party 310 are also again present. Unlike the embodiment of the present invention shown in FIG. 5, however, the communication mechanism 306 of this embodiment may communicate directly with the regulatory agency 308, as well as with the manufacturer or third party 310. As with the embodiment of FIGS. 3-4, a user 304 again acts as an intermediary between the legal for trade device 302 and the communication mechanism 306.

Figure 7:
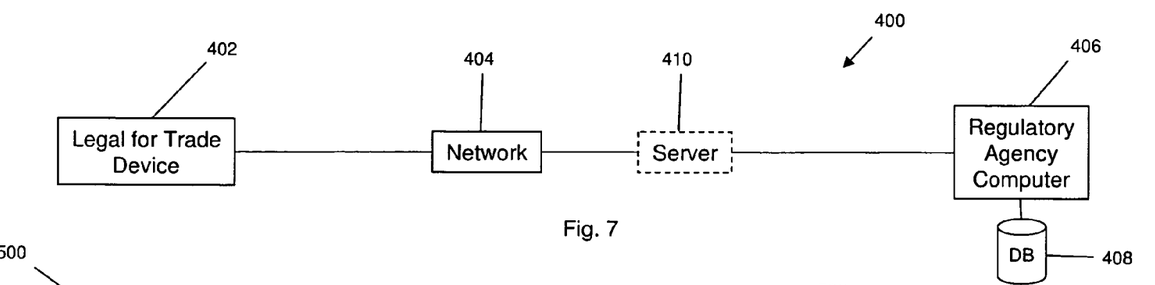
FIG. 7 illustrates another exemplary embodiment of a system for remotely certifying a legal for trade device.

Another exemplary embodiment of a remote certification system 400 of the present invention is shown in FIG. 7. This embodiment includes a legal for trade device 402 connected to a network 404. Any network known in the art may be used, such as, but not limited to, a LAN, WAN, WLAN or the Internet. The network 404 may be connected to a regulatory agency computer 406 or another acceptable agency device. Depending on the location of the legal for trade device 402 and, thus, the operation of the network 404, an intermediate server or other computer 410 may be used to effectuate communications between the network and the regulatory agency computer 406. The regulatory agency computer 406 may include a database 408. The database 408 may store information related to legal for trade devices with which the agency computer has communicated, such as, but not limited to, owner information, location data, model data, serial number, date of commissioning, and dates at which re-certification is required.

Figure 8:
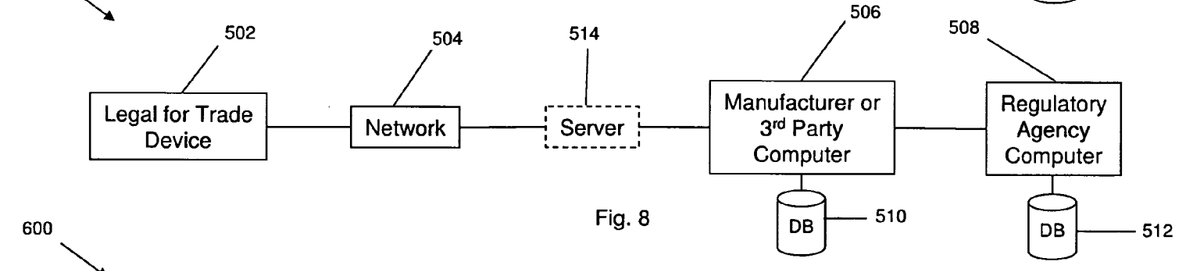
FIG. 8 illustrates another exemplary embodiment of a system for remotely certifying a legal for trade device.

Yet another exemplary embodiment of a remote certification system 500 of the present invention is shown in FIG. 8. This system 500 is shown to include a legal for trade device 502 connected to a network 504 that is, in turn, connected to a third party computer 506, such as the computer of a manufacturer. Depending on the location of the legal for trade device 502 and, thus, the operation of the network 504, an intermediate server or other computer 514 may be used to effectuate communications between the network and the third party computer 506. The third party computer 506 is also connected to a regulatory agency computer 508, such that data received from the legal for trade device 502 by the third party computer can be forwarded to the regulatory agency computer. The third party computer 506 may include a database 510. The regulatory agency computer 508 may also include a database 512. The database(s) may store various data, such as the data described above with respect to the embodiment of FIG. 4, or other relevant data.

When the third party computer 506 is a manufacturer computer, the manufacturer may be the manufacturer of a measurement component (e.g., scale, dimensioner, etc.) of the legal for trade device, but could be the manufacturer of another component(s) as well. When the third party computer 506 is other than a manufacturer's computer, the third party may be any of various entities such as, for example, an intermediary company that facilitates communication between a regulatory agency and an owner of a legal for trade device and assists with the remote certification process. The third party may be related to or associated with a manufacturer or a regulatory agency, or may be independent of both.

Figure 9:
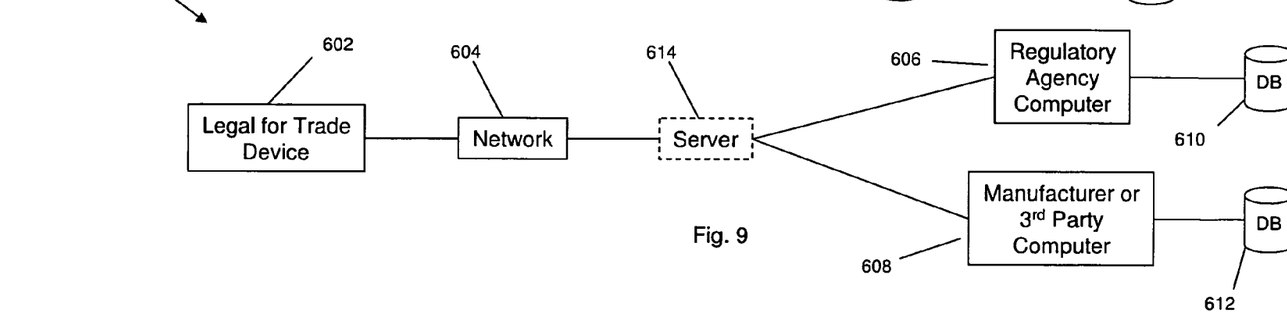
FIG. 9 illustrates another exemplary embodiment of a system for remotely certifying a legal for trade device.

Still another exemplary embodiment of a remote certification system 600 of the present invention is shown in FIG. 9. As shown, the system 600 includes a legal for trade device 602, a network 604, a regulatory agency computer 606 and a third party computer 608, such as the computer of a manufacturer. The network 604 is connected to the regulatory agency computer 606 and third party computer 608, either or both of which may contain a database, such as the databases 610 and 612 respectively shown. Unlike the embodiment of the present invention shown in FIG. 8, the network 604 of this embodiment is able to communicate directly with the regulatory agency computer 606 and third party computer 608. Depending on the location of the legal for trade device 602 and, thus, the operation of the network 604, an intermediate server or other computer 614 may be used to effectuate communications between the network, the third party computer 506, and the regulatory agency computer 606. The above description regarding the identity of a third party in regard to the system 500 of FIG. 8 also applies to this embodiment of the system 600.

In each of the exemplary embodiments shown in FIGS. 1-3 and 6-9, data from the legal for trade device can be communicated, directly or indirectly, with the regulatory agency via the communication mechanism. In the exemplary embodiments of FIGS. 5-6, such communication is effectuated by a user of the system. Communications between the legal for trade device and the regulatory agency may be unidirectional or bidirectional in nature. For example, such communications may be as simplistic as alerting the regulatory agency that the legal for trade device has passed a series of tests and is ready to be approved for use, or notifying the regulatory agency of an upcoming re-certification date. More broadly, however, communications according to the present invention are considered to include any exchange of information between a legal for trade device and a regulatory agency, manufacturer, other third party or other entity that is related to, without limitation, the location, installation, testing, verification, certification, removal or other operations of a legal for trade device.

Although not specifically shown, each of the exemplary embodiments depicted in FIGS. in 1-9 may also include an owner database in communication with the legal for trade device. The owner database may be used to store information related to the legal for trade device, which information may be the same as, or different from, information stored directly by the legal for trade device or a database associated with a regulatory agency, manufacturer or other third party.

Referring now to FIGS. 10-13, a number of exemplary embodiments of legal for trade devices can be observed. As discussed above, a legal for trade device of the present invention can be any of various devices used to measure a physical characteristic of a product, parcel, etc. However, for purposes of clarity and brevity, the illustrative exemplary embodiments of FIGS. 10-13 are directed only to weighing systems.

Figures 10, 11, 12, 13:
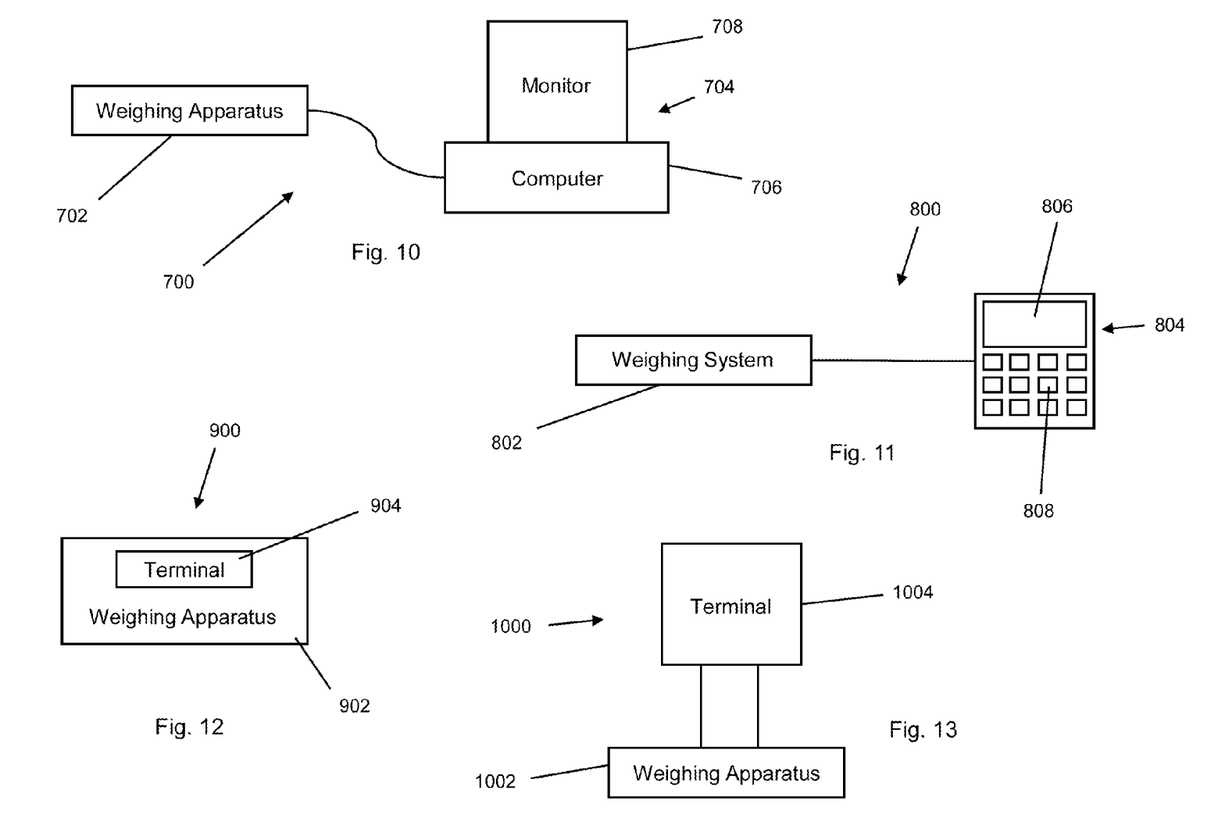
FIG. 10 illustrates one exemplary embodiment of a legal for trade device comprising a weighing system.
FIG. 11 illustrates another exemplary embodiment of a legal for trade device comprising a weighing system.
FIG. 12 illustrates another exemplary embodiment of a legal for trade device comprising a weighing system.
FIG. 13 illustrates another exemplary embodiment of a legal for trade device comprising a weighing system.

In the exemplary embodiment of FIG. 10, a weighing system 700 is shown to include a weighing apparatus 702 and a terminal 704. The terminal 704 may be any of various intelligent devices, such as a computer 706. In this exemplary embodiment, the computer 706 includes a monitor 708. The monitor 708 may be a separate component or may be integral to the computer 706.

Another exemplary embodiment of a legal for trade device is shown in FIG. 11. In this embodiment, a weighing system 800 includes a weighing apparatus 802 and a terminal 804. The terminal 804 may include an integrated display 806 and keypad 808.

Yet another exemplary embodiment of a weighing system 900 is illustrated in FIG. 12. In this particular embodiment, a weighing apparatus 902 and a terminal 904 are integrated into a single unit.

FIG. 13 depicts another exemplary embodiment of a weighing system 1000 having an integrated weighing apparatus 1002 and terminal 1004. In this exemplary embodiment, the terminal 1004 is, or is integrated with, an intelligent device such as a computer. Such a configuration may be generally referred to as a PC scale.

In each of the exemplary embodiments of FIGS. 10-13, the weighing system may include a software program (e.g., firmware, etc.) that can run one or more tests that will be described in more detail below. Such tests can be used to verify proper operation of the weighing system and, subsequently, permit remote certification thereof by the appropriate regulatory agency.

With further respect to the exemplary embodiments shown in FIGS. 10-13, it should be understood that the illustrated connections between device components are logical connections. That is, such connections can be wired or wireless in nature. Similarly, communications between a legal for trade device and a regulatory agency, or third party may be accomplished by wired or wireless techniques, such as by any of the communication methods described above or by other known methods.

Figure 14:
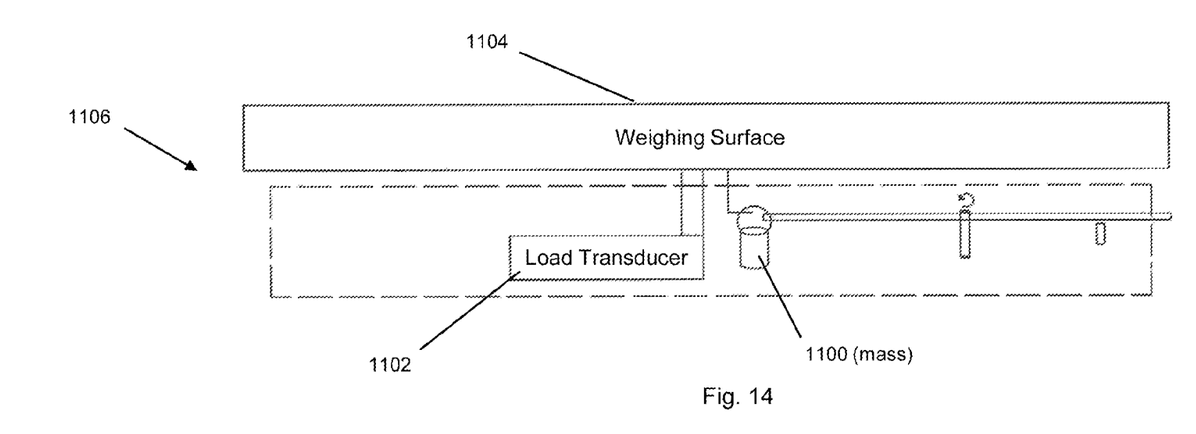
FIG. 14 illustrates one exemplary embodiment of a weighing apparatus.
Figure 15:
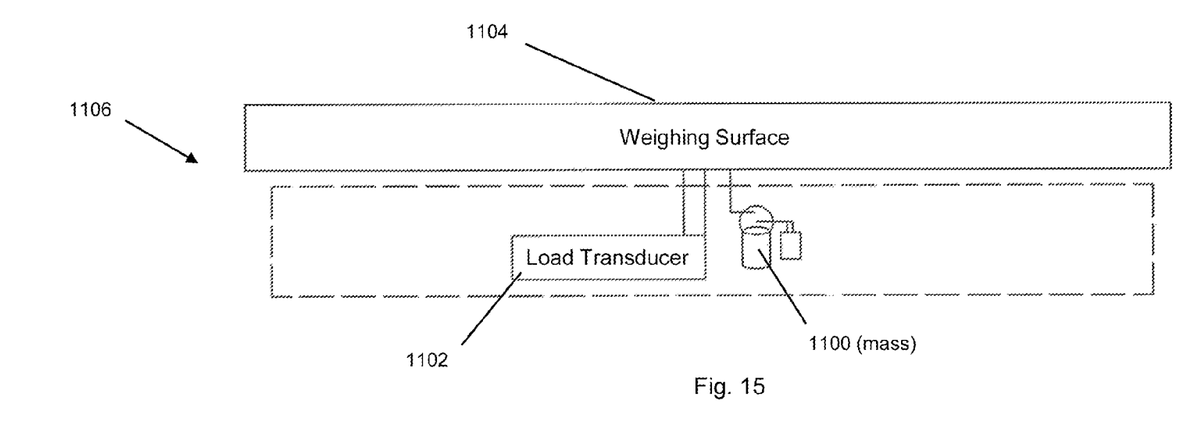
FIG. 15 illustrates another exemplary embodiment of a weighing apparatus.

FIGS. 14-15 illustrate various features that may be provided to a weighing system for effectuating remote certification. Similar or corresponding features may also be present on/in other legal for trade devices. However, as with the exemplary embodiments of FIGS. 14-15, FIGS. 14-15 are also directed specifically to weighing system embodiments for simplicity of illustration.

As shown in FIGS. 14-15, a mass 1100 of known weight may be programmed into the memory of a weighing system. The weighing system serial number and mass serial number may be recorded in a manufacturer database and/or a portion of the weighing system itself. The mass 1100 may be integrated into a weighing apparatus 1106 so that it can be applied to a load transducer 1102, weighing surface 1104, etc., of the weighing apparatus at a later time, such as when testing the operation of the weighing system.

The mass 1100 may be applied to the load transducer 1102, weighing surface 1104 or other structure of the weighing apparatus 1106 manually, electrically and/or mechanically. For example, the mass 1100 may be applied by manually removing the mass from one part of the weighing apparatus 1106 and applying it to the weighing surface 1104 thereof. Non-limiting examples of mechanisms for applying the mass 1100 to the load transducer 1102 or weighing surface 1104 are shown in FIG. 14 to include a slide bar, slide wheel, cam, lever and wedge that may be manually or electrically activated. Other non-limiting examples of mechanisms for mechanically applying the mass 1100 to the load transducer 1102 or weighing surface 1104 are shown in FIG. 15 to include a linear actuator, motor lift and/or magnetic lift.

A legal for trade device may be tested during the manufacturing process. One or more tests may be performed to verify the accuracy of the legal for trade device. Adjustments may be made to the legal for trade device until it passes the one or more tests. Once the one or more tests are passed, the legal for trade device may be metrologically locked and sealed prior to shipment. The results of the one or more tests may be stored in the memory of the legal for trade device.

Installation, activation and certification of a legal for trade device can be better understood by a reading of the following exemplary description. Generally, a newly obtained legal for trade is placed in a particular location, such as but not limited to, in a factory, at a branch of the U.S. Postal Service or another parcel carrier, at shipping docks, at point-of-sale locations, at retail locations, etc.

Once placed in the proper location, the legal for trade device may be powered on. The legal for trade device may be connected to a communication mechanism, as described above, or may be a standalone device. Once powered on, the legal for trade device may optionally verify that it is connected to a network or other communication mechanism. The legal for trade device may then run a program that performs one or more tests to verify the accuracy and proper functioning of the legal for trade device. This program may optionally interact with an owner or operator of the legal for trade device. Alternatively, this function of the legal for trade device may be completely autonomous—requiring no interaction with an owner or operator.

A number of tests may be performed on a legal for trade device in connection with a remote certification process of the present invention. One such test may request that the owner or operator of the legal for trade device either enter a geo code or the address postal code where the legal for trade device is installed (e.g., to compensate for gravity differences at different locations around the world). If an address is entered, the legal for trade device may reference a lookup table stored in its memory or an accessible database to find the correct geo code. The address may also be compared with a reference address and, if they match, a geo code may be downloaded from an internet site or a lookup table that is accessible by the legal for trade device. If the addresses do not match, the owner or operator may be asked to verify the location or enter a new geo code. The reference address could be looked up through an Internet connection or via another known method.

In an alternative embodiment, a legal for trade device may autonomously determine and enter the correct geo code. For example, a legal for trade device may be equipped with a GPS receiver or similar device that enables self-determination of location. The legal for trade device may then reference a lookup table stored in its memory, a separate but accessible database, or another information source to determine and enter the correct geo code.

Another test may be administered to check the legal for trade device for proper installation and operation. For example, with respect to a legal for trade device where level operation is of concern, an electronic level may be installed in/on the device to verify that it is installed on a sufficiently level surface. Similarly, a vibration monitor may also be installed in/on a legal for trade device to verify that the vibration of the mounting surface does not affect measurement accuracy. The electronic level reading and/or vibration readings may be recorded by the legal for trade device. If these readings are outside the acceptable operating parameters of the device, then the owner or operator may be asked to reposition the legal for trade device until such readings fall within an acceptable range.

When the legal for trade device is a weighing apparatus of a weighing system, for example, the owner or operator may be prompted to apply a test mass shipped with the weighing apparatus. If this mass is stored on the exterior of the weighing apparatus and must be applied to the weighing surface manually, then the owner or operator may be asked to enter the serial number inscribed on the mass. If the mass serial number entered matches the mass serial number stored in the weighing system or some associated database, the process may continue.

With the mass placed on the weighing surface, the weighing apparatus may verify that the indication is correct for the known weight of the mass. If the span is correct, the weighing apparatus may be correctly calibrated. The owner or operator may also be prompted to reposition the mass on the weighing surface to verify that off center loading indication is correct.

In alternative embodiments, a test mass may be automatically applied to a weighing apparatus without a need for owner or operator assistance. This may be accomplished by any technique known in the art, such as by the mechanisms shown in FIGS. 14-15

With respect to those legal for trade devices having an appropriate display, the owner or operator may be asked one or more questions to verify that the display is working correctly and is positioned so that a customer can see the display. Various other display testing methods could also obviously be employed.

A number of other tests for verifying the accuracy of a legal for trade device may also be performed, as would be understood by one skilled in the art. While the particular tests and the number of tests conducted may vary depending on the legal for trade device in question, the methods of the present invention preferably ensure that all tests that would normally be performed during an in-person verification/certification process are accomplished. For example, when the legal for trade device is a weighing apparatus, additional self-verification tests may include, without limitation, a zeroing increment test, an increasing/decreasing load test, and a test for verification of correct markings and indicators. Other tests are also possible, and such tests may be completely different from those already described when the legal for trade device is a dimensioner or another device other than a weighing apparatus.

The legal for trade device may then record the initial metrology parameters and maintain a log of any changes to these parameters. If these parameters change or an enclosure of a legal for trade device is altered (i.e. the seal is broken), the legal for trade device may attempt to allow a user to correct the problem. If unsuccessful, the legal for trade device may contact the manufacturer, a third party, or the appropriate regulatory agency.

Once it has been determined that a legal for trade device is functioning correctly, data about the legal for trade device may be directly or indirectly sent to a regulatory agency. A user may or may not act as an intermediary with respect to transmission of such data. This data may include, without limitation, identification data, location data, owner information and/or test results. This data may be sent through a wired or wireless communication mechanism, such as, but not limited to, any of the communication mechanisms previously described. The regulatory agency may have a computer or other intelligent device that is operative to store data received from a legal for trade device in a regulatory agency database.

Such data may also be sent to a manufacturer and/or other third party, one or both of which may also have a computer or other intelligent device and a database. As an alternative to transmitting data directly to a regulatory agency, data may be sent by a legal for trade device to a manufacturer and/or other third party, which may forward the data to the regulatory agency. A legal for trade device, a manufacturer, and/or another third party may also store this data for later use—whether locally or in a remote database associated therewith.

Once the necessary data is received, or received and evaluated, by the appropriate regulatory agency, the legal for trade device may be approved (certified) for use in legal for trade applications. Certification may be accomplished in a number of ways. For example, the legal for trade device may employ a self-verification methodology under which the legal for trade device simply sends its verification test results to the appropriate agency after successful completion thereof. Under this methodology, the agency will have agreed to accept the successful test results as confirmation of proper operation of the legal for trade device and, as such, self-certification of the device is automatic upon successful completion of the tests.

Alternatively, certification may depend on the receipt by the legal for trade device of a verification signal from the regulatory agency. Specifically, the verification test results associated with the legal for trade device are transmitted to the regulatory agency by any of the methods described above. If, upon review of the test results, the regulatory agency agrees that the legal for trade device is operating properly, the agency sends a verification signal back to the legal for trade device that is operative to render the legal for trade device certified.

In a similar, but slightly different methodology, the verification test results associated with the legal for trade device are transmitted to a third party by any of the methods described above. The third party then reviews the test results and determines if the legal for trade device is operating properly. If so, the third party sends a verification signal back to the legal for trade device that is operative to render the legal for trade device certified and, preferably, communicates the certification (and possibly the test results and/or other data) to the appropriate regulatory agency.

Other certification methodologies are also possible, and the above-described methodologies are provided only for illustration, not limitation. In any event, once certified, the legal for trade device will also function normally. However, should a legal for trade device fail one or more of the tests, the legal for trade device will generally not be approved for use in legal for trade applications until the one or more previously failed tests are subsequently passed.

Preferably, certification of a legal for trade device according to the present invention is performed remotely. Alternatively, the data sent to the regulatory agency or to a third party could be used by agency or third party personnel to reduce the work required to certify a legal for trade device during an in-person visit thereby.

Systems and methods of the present invention may provide for other desirable functions related to the certification and use of a legal for trade device. For example, as described previously, legal for trade devices typically require initial verification/certification as well as periodic re-verification/re-certification to ensure continuing proper function. As such, systems and methods of the present invention may operate to automatically notify the owner/operator of the responsibilities associated with a legal for trade device. For example, an owner/operator may be alerted to the need for verification/certification upon initial power up of such a device. Similarly, systems and methods of the present invention may provide for automatic contact of the appropriate regulatory agency by a legal for trade device upon its initial installation. This function may be quite beneficial to such regulatory agencies, as it serves as a mechanism to automatically identify devices that might otherwise be operated without verification. At least for the purpose of performing these functions, it is preferred that legal for trade devices associated with systems and methods of the present invention include a battery-backed real time clock.

With respect to periodic re-verification/re-certification, systems and methods of the present invention can automatically alert an owner or operator of a legal for trade device of the need for such service. The timing of such re-verification/re-certification notifications can be set to coincide with individual regulatory agency policy. Similarly, systems and methods of the present invention may automatically alert an appropriate regulatory agency of the need for re-verification/re-certification of a particular legal for trade device(s) and/or of the removal of a legal for trade device(s) from service. Because, as described above, re-verification/re-certification is currently often overlooked by the various regulatory agencies, automatic re-verification/re-certification and/or notification of the need therefor may provide the associated agencies with an increased revenue stream (as described in more detail below).

It is further possible for systems and methods of the present invention to automatically restrict operation or remove a legal for trade device from service. For example, if a legal for trade device fails any of the verification tests applied thereto, the systems and methods of the present invention may prevent the legal for trade device from operating, or may permit the legal for trade device to operate only in a restricted mode. It is further contemplated that a legal for trade device may be subjected to restricted operation or be automatically removed from service by systems and methods of the present invention if the legal for trade device has not undergone a re-verification/re-certification process by the required due date. In this latter situation, the systems of the present invention preferably present the owner or operator of the legal for trade device with advance warning that the legal for trade device will be subjected to restricted operation or removed from service on a given date if re-verification/re-certification does not take place.

Another desirable function of systems and methods of the present invention may include fee collection. An owner or operator of a legal for trade device is typically required to pay a fee for the verification and certification thereof. As such, systems and methods of the present invention may allow for an owner or operator to electronically pay the appropriate regulatory agency for such services, whether directly or through a third party. Such electronic payment may take place over the Internet and/or through any other electronic payment system/method known to those skilled in the art. Payments may also occur in virtually any other known manner, such as by check, deposit account, etc.

Various security protocols may be associated with data and/or monetary transmissions made in accordance with the present invention. For example, with respect to the transmission of data from the legal for trade device, one or both of identity and test result authorization/protection may be employed. Such authorization/protection may be accomplished by various encryption/authorization techniques known to those skilled in the art and, therefore, need not be described in detail herein.

While certain exemplary embodiments are described in detail above, the scope of this application is not to be considered limited by such exemplary embodiments, and modifications are possible without departing from the spirit of those embodiments as evidenced by the following claims:

What is claimed is:

1. A system for certifying a legal for trade device, comprising:
 a device for providing electronic instructions to the legal for trade device for running one or more tests to verify proper operation;
 a communication mechanism selectively connected to said legal for trade device for electronically transmitting results of said tests to a certifying authority to certify said legal for trade device; and
 a certification mechanism for receiving an electronic certification signal from the certifying authority certifying said legal for trade device.

2. The system of claim 1, wherein said legal for trade device is a weighing apparatus.

3. The system of claim 1, wherein said communication mechanism is selected from the group consisting of mail, fax, telephone, email, LAN, WAN, WLAN and Internet.

4. The system of claim 1, further comprising a display device associated with said legal for trade device.

5. The system of claim 1, further comprising a database associated with an owner or operator of said legal for trade device, said database operative to store information relating to said legal for trade device.

6. The system of claim 1, further comprising a manufacturer or third party in the transmission path between said legal for trade device and said regulatory agency.

7. The system of claim 1, wherein said communication mechanism also enables said legal for trade device to communicate with a manufacturer or third party.

8. The system of claim 7, further comprising a database associated with one or both of said regulatory agency and said manufacturer or third party, said database operative to store information relating to a legal for trade device from which said regulatory agency and/or said manufacturer or third party has received a communication.

9. A method for certifying a legal for trade device, comprising the steps of:
 providing electronic instructions to the legal for trade device to run one or more tests operative to verify the proper operation thereof;

transmitting electronically the results of the one or more tests from the legal for trade device to a certifying authority to certify said legal for trade device; and receiving electronically a certification signal from the certifying authority for said legal for trade device.

10. The method of claim 9, further comprising using said communication mechanism to enable communications between said legal for trade device and a manufacturer or third party.

11. The method of claim 9, wherein certification of said legal for trade device occurs upon successful completion of said tests and transmission of said results thereof directly or indirectly to said regulatory agency.

12. The method of claim 9, wherein certification of said legal for trade device occurs upon receipt at said legal for trade device of a verification signal transmitted by said regulatory agency in response to receipt by said regulatory agency of successful test results from said legal for trade device.

13. The method of claim 9, further comprising providing a database at said regulatory agency for storing information relating to said legal for trade device.

14. A method for certifying a legal for trade device, comprising the steps of:

providing electronic instructions to the legal for trade device adapted to run one or more tests operative to verify the proper operation thereof;

running said tests;

transmitting electronically the results of said tests to a certifying authority to certify said legal for trade device via a communication mechanism associated with said legal for trade; and receiving electronically at said legal for trade device via said communication mechanism, a signal from the certifying authority in response to receipt of said test results, said signal operative to certify said legal for trade device for use; and storing information relating to said legal for trade device in a database.

15. The method of claim 14, wherein said legal for trade device interacts with a user of said legal for trade device while running said tests.

16. The method of claim 14, wherein said legal for trade device runs said tests autonomously.

17. The method of claim 14, further comprising transmitting the results of said tests to a manufacturer or third party.

18. A method for certifying a legal for trade device, comprising the steps of:

providing the legal for trade device with means for electronically instructing the legal for trade device to run one or more self-verification tests operative to verify the proper operation thereof and of performing a self-certification operation upon the successful completion of said tests;

causing said legal for trade device to run said tests;

upon the successful completion of said tests, directly or indirectly electronically transmitting the results thereof to a certifying authority to certify said legal for trade device via a communication mechanism associated with said legal for trade device;

storing electronically information relating to said legal for trade device in a database; and performing said self-certification operation to certify said legal for trade device for use.

19. The method of claim 18, wherein said legal for trade device interacts with a user of said legal for trade device while running said tests.

20. The method of claim 18, wherein said legal for trade device runs said tests autonomously.

21. The method of claim 18, further comprising transmitting the results of said tests to a manufacturer or third party.

\* \* \* \* \*